(12) United States Patent
Ueda et al.

(10) Patent No.: US 6,530,696 B1
(45) Date of Patent: Mar. 11, 2003

(54) OPTICAL CONNECTOR AND OPTICAL COUPLING STRUCTURE

(75) Inventors: Tomohiko Ueda, Yokohama (JP); Toshiaki Kakii, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 6 days.

(21) Appl. No.: 09/631,618

(22) Filed: Aug. 4, 2000

(30) Foreign Application Priority Data

Aug. 9, 1999 (JP) ............................. 11-225319
May 25, 2000 (JP) ........................... 2000-155113

(51) Int. Cl.$^7$ ................................................ G02B 6/38
(52) U.S. Cl. .............................................. 385/60; 385/59
(58) Field of Search ............................ 385/59, 60, 62, 385/63, 55

(56) References Cited

U.S. PATENT DOCUMENTS

| | | | | |
|---|---|---|---|---|
| 4,741,590 A | * | 5/1988 | Caron | 385/60 |
| 5,619,604 A | * | 4/1997 | Shiflett et al. | 385/52 |
| 5,631,985 A | * | 5/1997 | Yamada et al. | 385/59 |
| 5,984,530 A | * | 11/1999 | Shahid | 385/55 |
| 6,085,003 A | * | 7/2000 | Knight | 385/59 |
| 6,095,695 A | * | 8/2000 | Ohtsuka et al. | 385/134 |
| 6,146,024 A | * | 11/2000 | Melchior | 385/59 |
| 6,168,317 B1 | * | 1/2001 | Shahid | 385/59 |
| 6,287,017 B1 | * | 9/2001 | Katsura et al. | 249/64 |

FOREIGN PATENT DOCUMENTS

| | | |
|---|---|---|
| JP | 2576605 | 7/1998 |
| JP | 11014862 | 1/1999 |

* cited by examiner

*Primary Examiner*—Tulsidas Patel
(74) *Attorney, Agent, or Firm*—McDermott, Will & Emery

(57) ABSTRACT

An optical connector includes a ferrule and a pair of guide pins. Fiber insertion holes and a pair of pin insertion holes are formed in the ferrule. Each of the pair of guide pins has a total length larger than that of each pin insertion hole. The guide pins are coupled to each other on one end portion thereof. The other ends of the guide pins can be accommodated in the pin insertion holes by sliding the guide pins. An optical connecting surface of the ferrule is located at the extreme tip portion when viewed from the optical axis direction of an optical fiber while the other ends of the pair of guide pins are accommodated in the pin insertion holes. This makes it possible to bring the optical connecting surface of the ferrule into contact with an opposite-side optical component while the other ends of the guide pins are accommodated in the pin insertion holes and prohibited from protruding from the optical connecting surface.

13 Claims, 7 Drawing Sheets

OPTICAL CONNECTOR AND OPTICAL COUPLING STRUCTURE

BACKGROUND OF THE INVENTION

1. Field of the Invention

The present invention relates to an optical connector used to optically connect an optical component and an optical coupling structure using the optical connector.

2. Related Background Art

In general, an optical fiber cable is optically connected to an optical component through an optical connector that is attached to an end portion of the optical fiber cable. The diameter of an optical fiber is about 0.125 mm. Since the connection loss increases unless the core portion of the optical fiber is accurately positioned, the optical connector and opposite-side optical component must be positioned to each other very accurately. For this reason, in optical connection using the above optical. connector, the optical connector and opposite-side optical component are accurately positioned to each other with guide pins.

An end portion of the optical fiber is placed on the optical connecting surface of the optical connector, and a pair of pin insertion holes for insertion of the guide pins are formed in the optical connecting surface.

Accordingly, end portions of the optical fiber and optical waveguide, optical elements, and the like are arranged on the optical connecting surface of the opposite-side optical component, and a pair of pin insertion holes for the insertion of the guide pins are formed in the optical connecting surface. In optical connection, the guide pins are respectively inserted into the pin insertion holes on the optical connector side to protrude from the optical connecting surface. When the protruding guide pins are inserted into the guide pin insertion holes of the opposite-side optical component, the end face of the optical fiber placed on the optical connecting surface of the optical connector is accurately positioned to the end face of the optical fiber of the opposite-side optical component, optical waveguide, optical elements, and the like.

SUMMARY OF THE INVENTION

According to an optical connector like the one described above, when an operator or the like attaches the optical connector, from which the guide pins protrude, to an opposite-side optical component, the distal ends of the guide pins sometimes damage the optical connecting surface of the opposite-side optical component, pin insertion holes, or the end faces of optical fibers. If the optical connecting surface or pin insertion holes are damaged, the guide pins rattle or dust or the like is produced. This makes it impossible to align optical fibers with high precision. In addition, if the end faces of optical fibers are damaged, the connection loss inevitably increases. Furthermore, when the operator or the like inserts the guide pins into the pin insertion holes of the opposite-side optical component or removes the guide pins therefrom, the pin insertion holes are scratched and damaged in some cases. Since the guide pins protrude from the optical connecting surface, the optical connecting surface is not easy to clean.

The present invention has been made in consideration of the above points, and has as its object to provide an optical connector that allows high-precision alignment without damaging an opposite-side optical component.

An optical connector according to the present invention is characterized by comprising a ferrule having an optical connecting surface with which an opposite-side optical component is brought into contact, and a pair of guide pins for aligning with the opposite-side optical component, wherein at least one fiber insertion hole into which an optical fiber is inserted and a pair of pin insertion holes into which the pair of guide pins are slidably inserted are formed in the ferrule, one end portion of the fiber insertion hole and one end portion of each of the pin insertion holes are open to the optical connecting surface, and each of the pair of guide pins has a total length larger than a total length of each of the pin insertion holes, the guide pins are coupled to each other on one end portion thereof, axial positions of the guide pins can be arbitrarily changed from outside, and other ends of the guide pins can be accommodated in the pin insertion holes by sliding the guide pins.

According to the optical connector of the present invention, the other ends of the guide pins can be accommodated in the pin insertion holes without making the other ends protrude from the optical connecting surface, and the optical connecting surface of the ferrule can be aligned to the opposite-side optical component with high precision by sliding the guide pins after bringing the optical connecting surface into contact with the opposite-side optical component. This makes it possible to prevent the other ends of the guide pins from damaging the opposite-side optical component in an optical connection process. In addition, the optical connecting surface can be easily cleaned. Furthermore, since the guide pins are slid after the optical connecting surface of the ferrule is brought into contact with-the opposite-side optical component, the guide pins do not scratch the opposite-side optical component in an optical connection process, thereby preventing damage to the opposite-side optical component.

According to the optical connector of the present invention, the other ends of the guide pins are accommodated in the pin insertion holes without making the other ends protrude from the optical connecting surface, and alignment is performed with high precision by sliding the guide pins after bringing the optical connecting surface of the ferrule into contact with the optical connecting surface of the opposite-side optical component. This makes it possible to perform optical connection without sliding the optical connector itself. As a consequence, the degree of freedom in disposing the optical connector and opposite-side optical component increases, and the space efficiency around the optical connector improves. And furthermore, it is possible to decrease a bend-of the optical fiber because the optical connector doesn't slide in the direction of the optical axis of the optical fiber.

An optical connector according to the present invention is characterized by comprising a ferrule having an optical connecting surface with which an opposite-side optical component is brought into contact, and a pair of guide pins for positioning with respect to the opposite-side optical component, wherein at least one fiber insertion hole into which an optical fiber is inserted and a pair of pin insertion holes into which the pair of guide pins are slidably inserted are formed in the ferrule, one end portion of the fiber insertion hole and one end portion of each of the pin insertion holes are open to the optical connecting surface, and each of the pair of guide pins has a total length larger than a total length of each of the pin insertion holes, and the guide pins are coupled to each other on one end portion thereof, the ferrule and the pair of guide pins can relatively move, and the optical connecting surface of the ferrule is located at an extreme tip-portion when viewed from an optical axis direction of the optical fiber while the opposite-side optical component is not connected.

According to the optical connector of the present invention, the ferrule and the pair of guide pins can move relative to each other. When the optical connecting surface of the ferrule is located at the extreme tip portion when viewed from the optical axis direction of optical fibers while the opposite-side optical component is not connected, the optical connecting surface of the ferrule can be brought into contact with the opposite-side optical component while the other ends of the guide pins are accommodated in the pin insertion holes without making the other ends protrude from the optical connecting surface. This makes it possible to prevent the other ends of the guide pins from damaging the opposite-side optical component in an optical connection process and facilitate cleaning the optical connecting surface.

According to the optical connector of the present invention, when an opposite-side optical component is mounted on a board, the optical connector can be transferred from above the board. This facilitates optical connection of the optical connector to the opposite-side optical component mounted on the board.

Preferably, this connector further comprises pin locking means for locking the pair of guide pins while the other ends of the pair of guide pins are accommodated in the pin insertion holes. With this arrangement, the other ends of the guide pins can be kept accommodated in the pin insertion holes, and the other ends of the guide pins can be prevented from accidentally protruding from the optical connecting surface in an optical connection process. This facilitates an optical connection process and prevents damage to the opposite-side optical component.

Preferably, this connector further comprises pin removal preventing means for preventing the pair of guide pins from falling off from the pin insertion holes. With this arrangement, removal of the guide pins from the pin insertion holes can be prevented more reliably. This makes it possible to eliminate a hindrance to a connection process due to removal of the guide pins before optical connection and reliably. maintain the optical connection state after optical connection.

A chamfered portion is preferably formed on at least a portion of an edge portion of the optical connecting surface. This can prevent a portion near the optical connecting surface of the optical connector from straddling the opposite-side optical component and facilitate an optical connection process. In addition, damage to the portion near the optical connecting surface can be prevented.

Preferably, this connector further comprises pin fixing means for fixing the pair of guide pins while. the other ends of the pair of guide pins protrude from the optical connecting surface. With this arrangement, since the guide pins protruding from the optical connecting surface can be reliably fixed, the accurately aligned state after optical connection can be maintained.

Preferably, this connector further comprises a coupling member for coupling the pair of guide pins on the one end portion of the pair of guide pins thereof, and a spring disposed between the coupling member and the ferrule, and the spring biases the ferrule to press the optical connecting surface of the ferrule against the optical connecting surface of the opposite-side optical component. With this arrangement, the guide pins can be inserted into the opposite-side optical component while the biasing force of the spring on the ferrule is small, thereby making the guide pins float more properly.

An optical connector according to the present invention is characterized by comprising a ferrule having an optical connecting surface with which an opposite-side optical component is brought into contact, and a pair of guide pins for positioning with respect to the opposite-side optical component, wherein at least one fiber insertion hole into which an optical fiber is inserted and a pair of pin insertion holes into which the pair of guide pins are slidably inserted are formed in the ferrule, one end portion of the fiber insertion hole and one end portion of each of the pin insertion holes are open to the optical connecting surface, and each of the pair of guide pins has a total length larger than a total length of each of the pin insertion holes, the guide pins are coupled to each other on one end portion thereof, a sliding position of the guide pins can be arbitrarily changed, and other ends of the guide pins can be accommodated in the pin insertion holes by sliding the guide pins, and the optical connecting surface of the ferrule is located at an extreme tip portion when viewed from an optical axis direction of the optical fiber while the other ends of the pair of guide pins are accommodated in the pin insertion holes.

According to the optical connector of the present invention, the optical connecting surface of the ferrule is brought into contact with the opposite-side optical component while the other ends of the guide pins are accommodated in the pin insertion holes without making the other ends protrude from the optical connecting surface. After the optical connecting surface is brought into contact with the opposite-side optical component, high-precision alignment can be performed by sliding the guide pins. This can prevent the other ends of the guide pins from damaging the opposite-side optical component in an optical connection process. In addition, the optical connecting surface can be easily cleaned. Furthermore, since the guide pins are slid after the optical connecting surface of the ferrule is brought into contact with the optical connecting surface of the opposite-side optical component, the guide pins do not scratch the opposite-side optical component in an optical connection process, thereby preventing damage to the opposite-side optical component.

In addition, the other ends of the guide pins are accommodated in the pin insertion holes without making the other ends protruding from the optical connecting surface, and the optical connecting surface of the ferrule is brought into contact with the optical connecting surface of the opposite-side optical component. Thereafter, high-precision alignment is performed by sliding the guide pins. This makes it possible to perform optical connection without sliding the optical connector itself. As a consequence, the degree of freedom in disposing the optical connector and opposite-side optical component increases, and the space efficiency around the optical connector improves. And furthermore, it is possible to decrease a bend of the optical fiber because the optical connector doesn't slide in the direction of the optical axis of the optical fiber.

An optical coupling structure according to the present invention is an optical coupling structure for optically coupling the optical connector defined in claim 1 or 8 to an optical module surface-mounted on a board, characterized in that the optical module includes an optical connecting surface with which an optical connecting surface of the ferrule is brought into contact, and an extended portion extended in a direction substantially perpendicular to an optical fiber accommodated in the ferrule, and the optical connector or a portion thereof and the extended portion are clamped by a clamp member.

According to the optical coupling structure of the present invention, the optical connector (or its portion) and the extended portions of the optical modules are clamped by the clamp member to bring the optical connecting surfaces of the ferrule and optical module into contact with each other. For this reason, the force that brings the optical connecting surfaces of the ferrule and optical module into contact with each other does not act on the main body of the optical module. This makes it possible to prevent damage to the optical module and maintain a stably optically coupled state.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
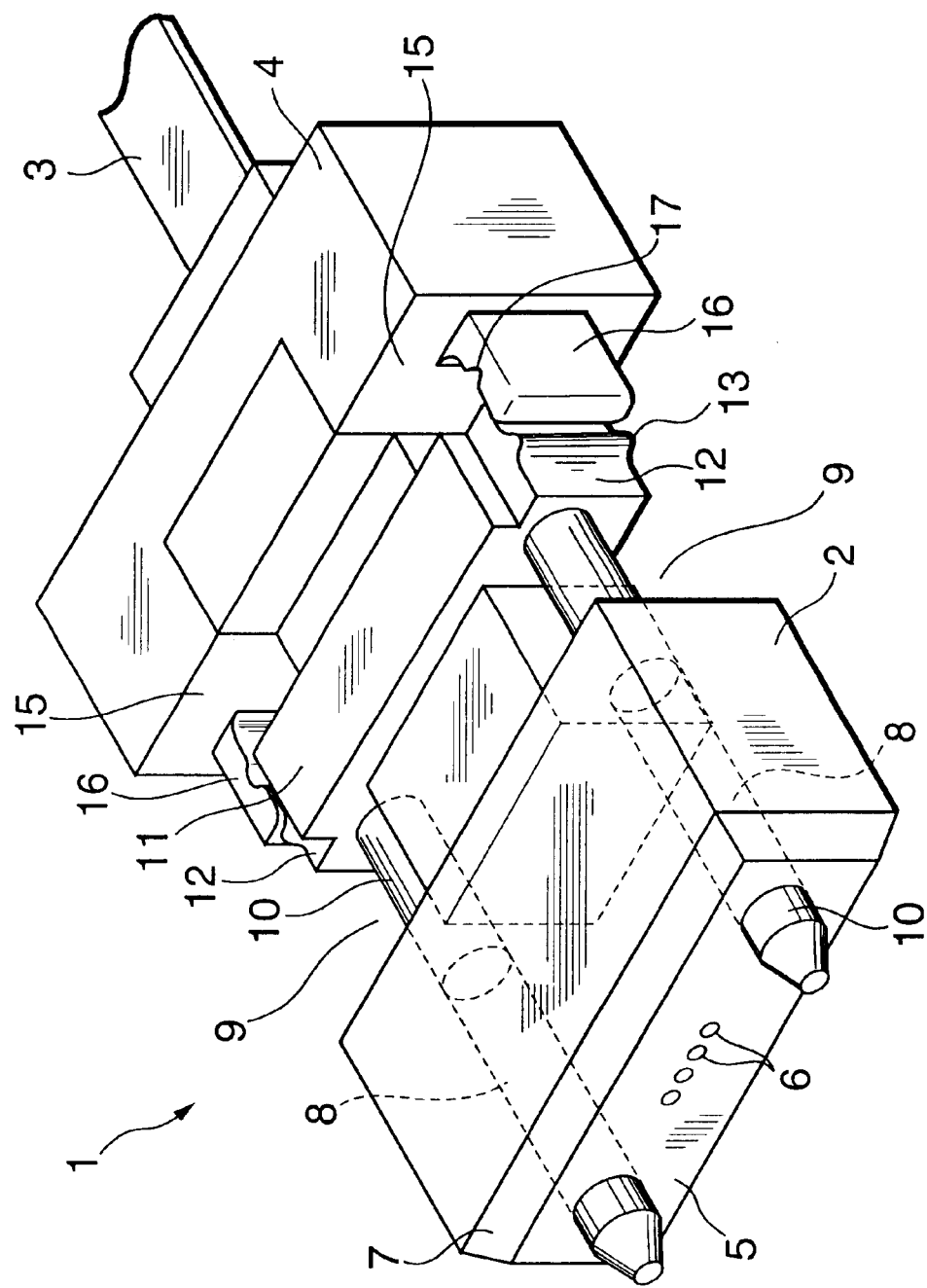
FIG. 1 is a perspective view showing the first embodiment of the optical connector of the present invention.
Figure 2A:
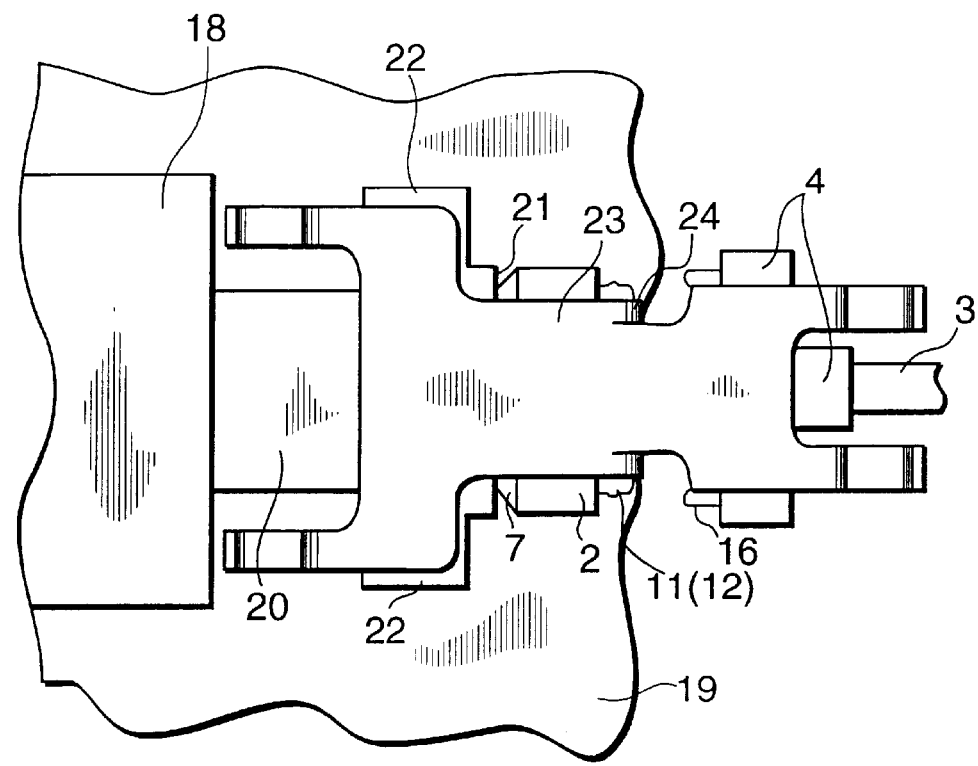
FIG. 2A is a plan view showing the optical connection state of the optical connector in FIG. 1.
Figure 2B:
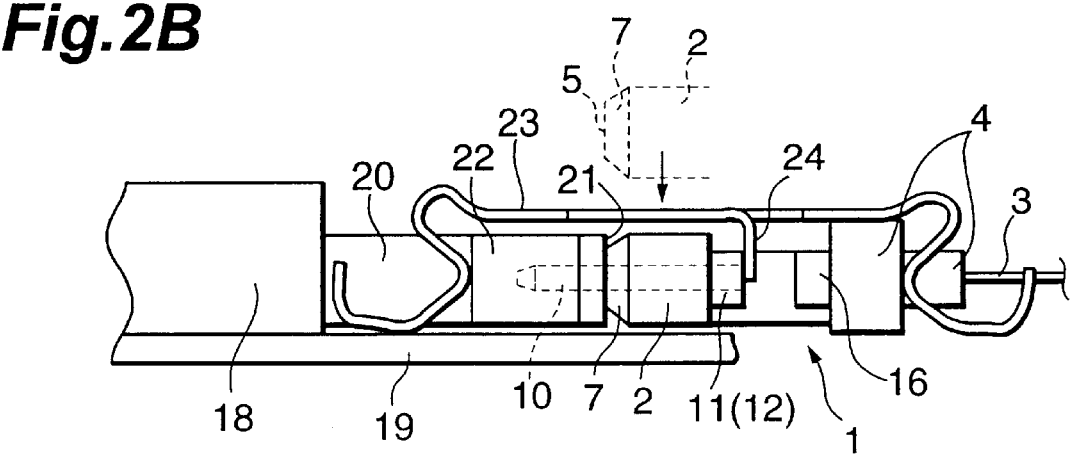
FIG. 2B is a side view showing the optical connection state of the optical connector in FIG. 1.

The embodiments of the optical connector of the embodiments of the present invention will be described with reference to the accompanying drawings. Note that the same reference numerals denote the same parts throughout the drawings, and a repetitive description will be avoided. FIGS. 1, 2A, and 2B show the first embodiment of the optical connector of the present invention.

(First Embodiment)

As shown in FIG. 1, an optical connector 1 of this embodiment has an arrangement complying with a so-called MT connector and is mainly comprised of a ferrule 2, which is brought into contact with an opposite-side optical component, and a boot portion 4 serving as the lead-in portion of an optical fiber cable 3. The ferrule 2 is made of a hard resin or the like which is not easily deformed by external force or heat. The boot portion 4 is made of an elastically deformable resin such as hard rubber, and moderately deforms so as not to apply any local load on the optical fiber cable 3.

An optical connecting surface 5 into which an opposite-side optical component is brought into contact is formed on one end of the ferrule 2. A chamfered portion 7 is formed on the edge portion of the optical connecting surface 5. Four fiber insertion holes 6 accommodating the distal end portions of optical fibers in the optical fiber cable 3 are formed through the ferrule 2. One end portion of each of the four fiber insertion holes 6 is open to an almost central portion of the optical connecting surface 5. The ferrule 2 has a constricted portion on the boot portion 4 side. The fiber insertion holes 6 reach the boot portion 4 through the constricted portion.

The resin sheath of the distal end portion of the optical fiber cable 3 is removed to expose the optical fibers. The exposed optical fibers are inserted into the fiber insertion holes 6 of the ferrule 2 through the boot portion 4. An opening recess (not shown) is formed in a side (the lower surface side of the ferrule 2 in FIG. 1) of the ferrule 2 which is not shown in FIG. 1. An intermediate portion of each fiber insertion hole 6 is exposed as a groove portion on the internal surface of the opening recess. The optical fibers accommodated in the fiber insertion holes 6 are fixed to the ferrule 2 by charging an adhesive through the opening recess.

Pin insertion holes 8 are respectively formed through portions on the two sides of the group of the four fiber insertion holes 6. One pair of pin insertion holes 8 are parallel to the fiber insertion holes 6. One end portion of each pin insertion hole 8 is open to the optical connecting surface 5. The other end portion of each pin insertion hole 8 is open to a notched portion 9 formed in a side portion of the constricted portion of the ferrule 2. A guide pins 10 is slidably inserted into each pin insertion hole 8. Each guide pins 10 is longer than the pin insertion hole 8, and one or the other end portion of each guide pin 10 protrudes from the corresponding pin insertion hole 8.

The one end portions of the pair of guide pins 10 are coupled by a U-shaped coupling member 11. By moving the coupling member 11, the pair of guide pins 10 and ferrule 2 can be relatively moved, and the pair of guide pins 10 can be simultaneously slid. The coupling member 11 is made of an elastically deformable resin. Holes in which guide pins 10 are fitted are formed in end portions 12 on the two sides of the. coupling member 11. Slits are formed in the holes formed in the two end portions 12 of the coupling member 11. The respective end portions 12 of the coupling member 11 are pressed against the one end portions of the guide pins 10 and are fitted in the holes, thereby-coupling the pair of-guide pins 10. The other end portion of each guide pin 10 is tapered to be easily inserted into the pin insertion hole of the opposite-side optical component. Since the pair of guide pins 10 are coupled with the coupling member 11, the two guide pins 10 can be slid with one operation. This facilitates optical connection between the optical connector 1 and the opposite-side optical component.

The central portion of the coupling member 11 straddles the constricted portion of the ferrule 2, and serves as an operation portion for sliding the pair of guide pins 10. The one end portions of the pair of guide pins 10 are coupled with the coupling member 11. This restricts sliding of the guide pins 10 toward the other end thereof, and prevents the guide pins 10 from falling off to the optical connecting surface 5 side. A locking projection 13 is formed on the outside surface of each end portion 12 of the coupling member 11 in a direction perpendicular to the guide pin 10.

An abutment surface 15 of the boot portion 4 exists on the extended line of each guide pin 10 on the one end portion thereof. The one end portion of each guide pin 10 comes into contact with the corresponding abutment surface 15 before the other end of the guide pin 10 falls off from the pin insertion hole 8. The one end portion of each guide pin 10 comes into contact with the corresponding abutment surface 15 to restrict sliding of the guide pin 10 to the one end portion thereof. This prevents each guide pin 10 from falling off. In this embodiment, the coupling member 11 functions as a pin removable preventing means for preventing each guide pin 10 from falling off from the pin insertion hole 8 toward its other end portion. In this embodiment, the abutment surfaces 15 also serve as pin removable preventing means for preventing the guide pins 10 from falling off from the pin insertion holes 8 toward their one end portions.

Projection pieces 16 protrude from the respective abutment surfaces 15. The projection pieces 16 have inner surfaces facing each other. Locking recesses 17 are respectively formed in the inner surfaces of these projection pieces 16. The locking recesses 17 are formed at right angles with respect to the guide pins 10 and locked to the locking projections 13 described above. When the pair of guide pins 10 are slid until their one end portions are brought into contact with the abutment surfaces 15, the other end portions of the guide pins 10 are located nearer to the inner portion side of the ferrule 2 than the optical connecting surfaces 5, i.e., accommodated in the pin insertion holes 8. As described above, while the opposite-side optical component is not connected, i.e., each guide pin 10 is accommodated in the pin insertion hole 8, the optical connecting surface 5 of the ferrule 2 is positioned at the extreme tip portion of the optical connector 1 when viewed from the optical axis direction of the optical fiber.

In this case, each projection piece 16 temporarily undergoes elastic deformation, and is restored to the normal position by its elastic restoring force when the locking projection 13 is locked to the locking recess 17, thereby keeping the locking projection 13 and locking recess 17 locked. That is, in this embodiment, the locking projections 13 and locking recesses 17 serve as a pin locking means for locking the guide pins 10 while preventing the other ends of the respective guide pins 10 from protruding from the optical connecting surface 5.

A state wherein the optical connector 1 is optically connected to the opposite-side optical component will be described next with reference to FIGS. 2A and 2B.

Assume that the opposite-side optical component is an optical module 18 for performing light/electricity conversion or electricity/light conversion. The optical module 18 is mounted on a printed circuit board 19. The optical module 18 has a connecting portion 20 for optical connection to the optical connector 1. Pin insertion holes (not shown) into which the guide pins are inserted are formed in an optical connecting surface 21 of the connecting portion 20 in correspondence with the optical connecting surface 5 of the optical connector 1.

The end faces of the optical fibers in the fiber insertion holes 6 exposed on the optical connecting surface 5 of the optical connector 1 are accurately aligned with optical transfer portions (not shown) such as optical fibers exposed on the optical connecting surface 21 of the optical module 18 by the guide pins 10. Extended portions 22 are extended from sides of the optical connecting surface 21 of the connecting portion 20 in a direction parallel to the printed circuit board 19. The extended portions 22 are extended in a direction almost perpendicular to the optical fibers accommodated in the above optical connector 1 optically coupled to the optical module 18. The optical connector 1 and optical module 18 are kept optically connected (optically coupled) to each other by using the extended portions 22 and a clamp spring (clamp member) 23. This will be described later.

When the optical connector 1 is to be optically. connected to the optical module 18, the guide pins 10 of the optical connector 1 are slid first, and then the other ends of the guide pins 10 are accommodated in the pin insertion holes 8. Since this state is maintained by the pin locking means constituted by the locking projections 13 and locking recesses 17, the guide pins 10 do not accidentally protrude from the optical connecting surface 5. The optical connector 1 is almost vertically lowered to the printed circuit board 19 so as to bring the optical connecting surface 5 of the optical connector 1 into contact with the optical connecting surface 21 of the optical module 18. In this case, the optical connecting surface 5 is cleaned as needed. Since the guide pins 10 do not protrude from the optical connecting surface 5, cleaning is facilitated.

While the opposite-side optical component is not connected, i.e., the respective guide pins 10 are accommodated in the pin insertion holes 8, the optical connecting surface 5 of the ferrule 2 is located at the extreme tip portion of the optical connector 1 when viewed from the optical axis direction of each optical fiber, and the guide pins 10 do not protrude from the optical connecting surface 5 of the optical connector 1. This makes it possible to bring the optical connecting surface 5 of the optical connector 1 into contact with the optical connecting surface 21 of the optical module 18 without sliding the optical connector 1 itself. In addition, since the optical connector 1 itself need not be slid, components can be mounted on the printed circuit board 19 behind the optical connector 1. Furthermore, since the chamfered portion 7 is formed at the edge portion of the optical connecting surface 5 of the optical connector 1, the optical connecting surfaces 5 and 21 can be easily brought into contact with each other without causing the optical connector 1 to straddle the connecting portion 20.

Subsequently, the coupling member 11 is operated to make the other end portions of the guide pins 10 protrude from the optical connecting surface 5 and be inserted into the pin insertion holes (not shown) of the optical module 18. With this operation, the optical connector 1 and optical module 18 are aligned with high precision. When the optical connecting surfaces 5 and 21 are almost aligned with each other, the guide pins 10 are slid. This prevents the guide pins 10 from damaging the pin insertion holes of the optical connecting surface 21 of the optical module 18, and also prevents the guide pins 10 from scratching the pin insertion holes.

The optical connector 1 of this embodiment also has the clamp spring 23 formed by a metal spring member and designed to ensure optical connection to the opposite-side optical component (optical module 18). Finally, the clamp spring 23 is mounted on the optical connector 1 and optical module 18 aligned with the guide pins 10 to clamp the optical connector 1 and extended portions 22. This reliably maintains the state wherein the optical connecting surface 5 is in contact with the optical connecting surface 21 of the optical module 18.

Note that the clamp spring 23 has a pair of bent portions 24 on the two edge portions of the central portion. Each bent portion 24 functions as a pin fixing means for suppressing sliding of the corresponding guide pin 10 and fixing it by pressing the one end portion of the guide pin 10 protruding from the optical connecting surface 5. By suppressing the sliding movements of the guide pins 10 with the pair of bent portions 24, the other end portions of the guide pins 10 can be prevented from falling off from the pin insertion holes (not shown) of the optical module 18, thereby reliably maintaining the optical connection state of the optical connector 1 and optical module 18.

As described above, the optical module 18 of the clamp spring 23 is locked to the extended portions 22. The force of the clamp spring 23 which brings the optical connecting surface 5 of the optical connector into contact with the optical connecting surface 21 of the optical module 18 does not act on the main body side of the optical module 18. This can prevent damage to the optical module 18 and maintain the stably optically coupled state. To facilitate aligning the optical connector 1 and optical module 18, for example, a member having a groove portion for aligning the optical connector 1 and connecting portion 20 may be disposed on the printed circuit board 19.

As described above, the optical connector 1 can be optically connected to the optical module 18 without sliding the optical connector 1 itself. However, this does not indicate that the optical connector 1 itself must not be moved in the axial direction of the guide pins 10. Although the optical connector 1 of the above embodiment is used while being connected to the distal end of the optical fiber cable 3, the optical connector of the present invention may be used while being directly mounted on a printed circuit board. The usage of the optical connector is not limited to the embodiment described above.

As described above, in this embodiment, the optical connector 1 itself need not be slid in optical connecting operation. In contrast to this, a conventional connector having guide pins protruding from its optical connecting surface must always be slid itself in optical connecting operation. Inconveniences in such a case will be briefly described below.

Figure 7:
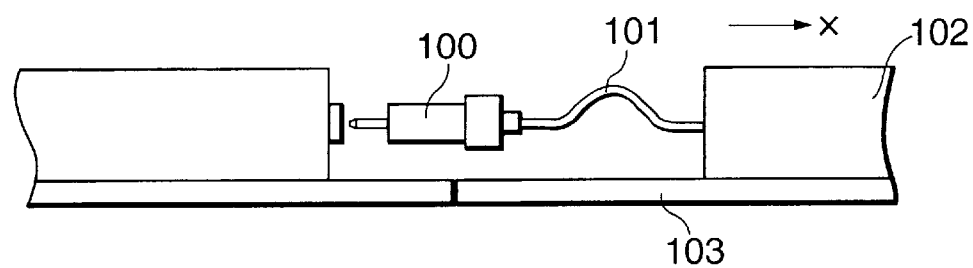
FIG. 7 is a side view of a conventional optical connector, showing an example of usage.

If guide pins protrude from the optical connecting surface of an optical connector, a slide amount that allows the guide pins to be inserted into an opposite-side optical component must always be ensured. For this reason, as shown in FIG. 7, an optical fiber cable 101 connected to an optical connector 100 may be locally bent. Note that a board 103 on which an optical module 102 to which the optical connector 100 in FIG. 7 is attached is mounted cannot move to the right in FIG. 7. A local bend in the optical fiber cable 101 increases transmission loss or leads to damage to an optical fiber in the worst case. In addition, since a space that allows the optical connector 100 to slide must be ensured on the board 103, the component mounting space of the board 103 decreases, as shown in FIG. 7.

Figure 8:
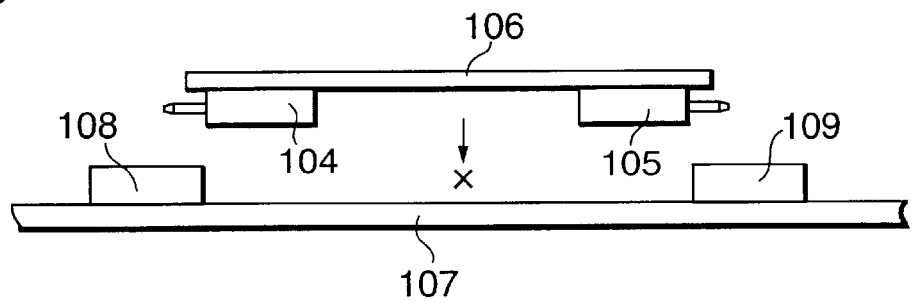
FIG. 8 is a side view of a conventional optical connector, showing an example of usage.

Assume that optical connectors 104 and 105 are directly mounted on a board 106 in opposite directions, as shown in FIG. 8, and these connectors are to be optically connected to opposite-side optical connectors 108 and 109 mounted on a board 107. In this case, the user wants to fit the board 106 from above the board 107, but cannot fit them in the presence of guide pins 110 and 111. This is because a slide amount for optical connection between the optical connectors 104 and 105 cannot be ensured.

In the optical connector 1 of this embodiment, since the user can arbitrarily slide the guide pins 10 from outside the optical connector 1, there is no need to slide the optical connector 1 itself in optical connecting operation. As a consequence, the optical connector 1 of this embodiment is free from the above problem. As described above, the user can arbitrarily slide the guide pins 10 from outside the optical connector 1, and the other ends of the guide pins 10 can be accommodated in the pin insertion holes 8. This makes it possible to increase the degree of freedom in disposing the optical connector 1 itself and opposite-side optical component.

(Second Embodiment)

The second embodiment of the optical connector of the present invention will be described next with reference to FIGS. 3, 4A and 4B.

Figure 3:
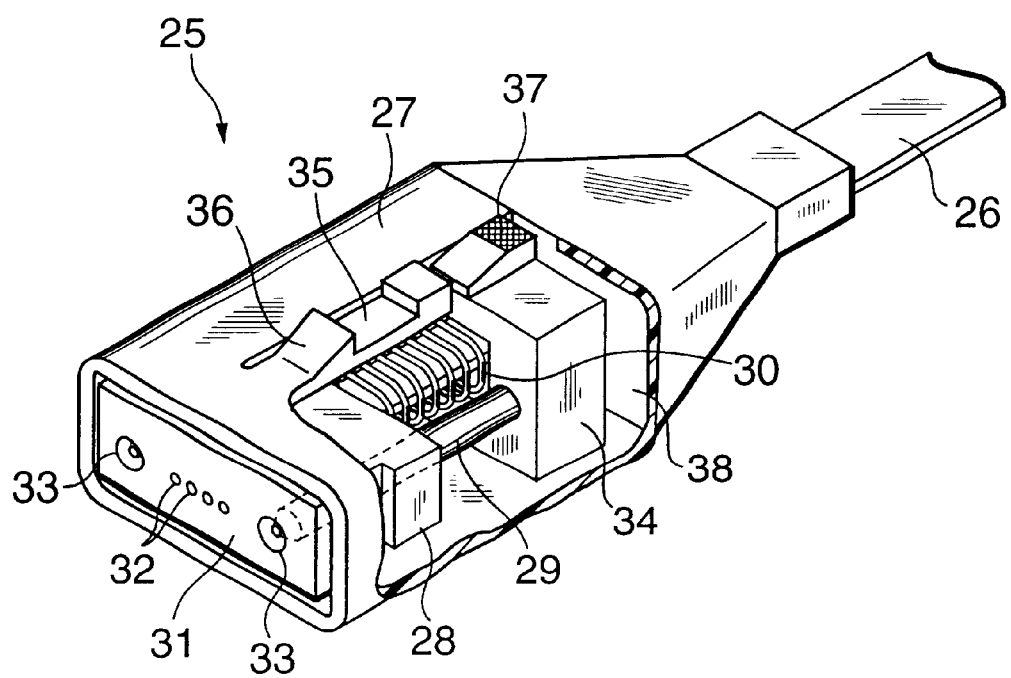
FIG. 3 is a perspective view showing the second embodiment of the optical connector of the present invention.
Figure 4A:
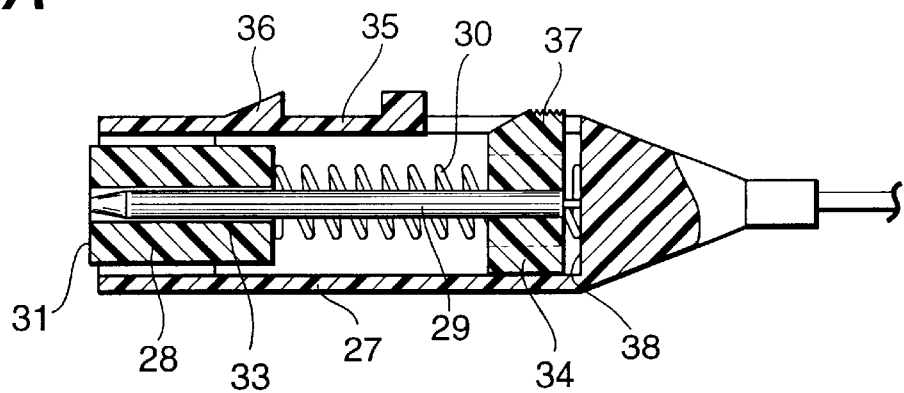
FIG. 4A is a sectional view of the optical connector in FIG. 3, showing an optical non-connection state.

As shown in FIGS. 3 and 4A, an optical connector 25 of this embodiment is a cantilever latch type optical connector. The optical connector 25 of this embodiment is also attached to the distal end of an optical fiber cable 26. The optical connector 25 has a ferrule 28, a pair of guide pins 29, and the like in a housing member 27. An optical connecting surface 31 of the ferrule 28 slightly protrudes from the housing member 27, and the ferrule 28 is always biased toward the optical connecting surface 31 by a spring 30. However, stepped portions formed on side surfaces of the ferrule 28 engage with projections (not shown) on the inner surface of the housing member 27 to prevent the ferrule 28 from popping out of the housing member 27.

Fiber insertion holes 32 and pin insertion holes 33 are formed through the ferrule 28. One end portion of each fiber insertion hole 32 is open to the optical connecting surface 31 of the ferrule 28 as in the first embodiment. All the fiber insertion holes 32 and pin insertion holes 33 are parallel to each other. The guide pins 29 are respectively inserted into the pair of pin insertion holes 33. Each guide pin 29 is longer than each pin insertion hole 33. The one end portions of the pair of guide pins 29 are coupled to each other through a coupling member 34 having a through hole in its central portion.

The spring 30 is inserted into the through hole formed in the central portion of the coupling member 34, and the optical fiber cable 26 is also inserted into the through hole. Optical fibers in the optical fiber cable 26 are inserted and fixed in the fiber insertion holes 32 of the ferrule 28. The pair of guide pins 29 are slidable in the axial direction, and movable relative to the ferrule 28. The housing member 27 has a cantilevered locking piece 35 on its one surface side, and a locking pawl 36 is formed on the upper surface of the locking piece 35. In addition, a slit is formed in the distal end portion side of the locking piece 35, and a tilted projection 37 formed on the upper surface of the coupling member 34 is accommodated in the slit.

This tilted projection 37 serves as an operation portion when the pair of guide pins 29 are slid. Note that the one end portions of the pair of guide pins 29 are coupled through the coupling member 34, the sliding movements of the guide pins 29 to the other end thereof are restricted to prevent the guide pins 29 from falling off to the optical connecting surface 31 side. An abutment surface 38 exists on the extended line of the one end portion of each guide pin 29. The one end portion of each guide pin 29 comes into contact with the abutment surface 38 before the other end of the guide pin 29 falls off from the pin insertion hole 33. This prevents the guide pins 29 from falling off.

Figure 4B:
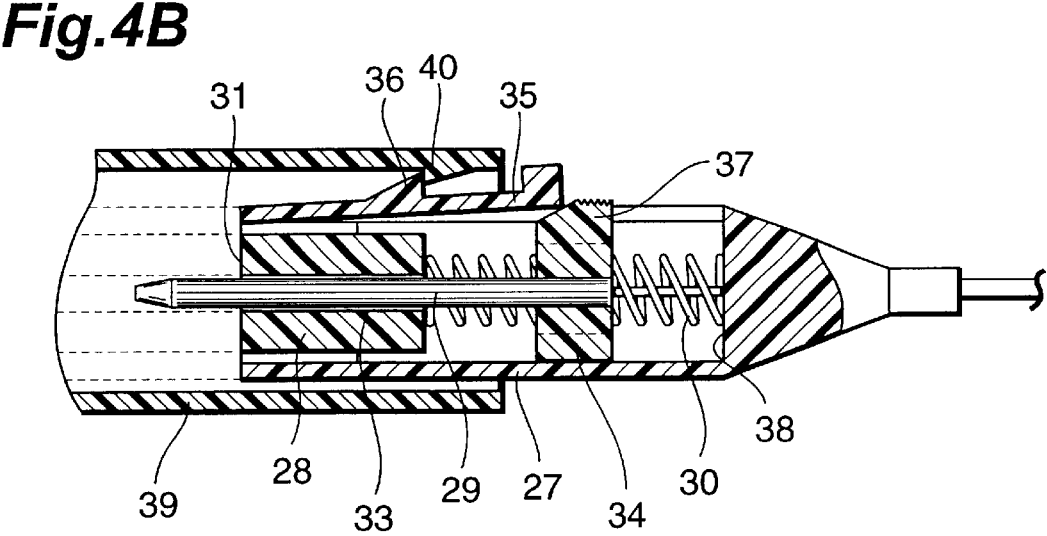
FIG. 4B is a sectional view of the optical connector in FIG. 3, showing an optical connection state.

When the above optical connector 25 is to be optically connected to the opposite-side optical connector, an adapter 39 is used as shown in FIG. 4B. The adapter 39 has two ends formed symmetrically with respect to its central portion. A pawl portion 40 that is locked to the locking pawl 36 described above is formed on the inner surface of the adapter 39. In this case, the opposite-side optical connector has the same arrangement as that of the optical connector 25 described above except that the pair of guide pins 29 are omitted. First of all, the coupling member 34 is operated to accommodate the other ends of the guide pins 29 in the pin insertion holes 33. The optical connecting surface 31 is cleaned, as needed. Since the guide pins 29 do not protrude from the optical connecting surface 31, cleaning is facilitated. In addition, while the opposite-side optical connector is not connected, i.e., the guide pins 29 are accommodated in the pin insertion holes 33, the optical connecting surface 31 of the ferrule 28 is located at the extreme tip portion of the optical connector 25 when viewed from the optical axis direction of optical fibers.

When the optical connector 25 described above is inserted from one end of the adapter 39, and the opposite-side optical connector is inserted from the other end, the locking pawl 36 is locked to the pawl portion 40 while the optical connecting surface 31 of the optical connector 25 is pressed against the optical connecting surface of the opposite-side optical connector with the elastic restoring force of the spring 30. The same applies to the opposite-side optical connector. In this case, the ferrule 28 slightly moves toward the housing member 27. In this state, the tilted projection 37 of the coupling member 34 is operated to make the other ends of the pair of guide pins 29 protrude from the optical connecting surface 31 and insert them into the pin insertion holes of the opposite-side optical connector.

As a consequence, while the opposite-side optical connector is not connected, i.e., the guide pins 29 are accommodated in the pin insertion holes 33, the optical connecting surface 31 of the ferrule 28 is located at the extreme tip portion of the optical connector 25 when viewed from the optical axis direction of the optical fibers, and the guide pins 29 do not protrude from the optical connecting surface 31 of the optical connector 25. This allows the optical connecting surface 31 of the optical connector 25 to be brought into contact with the optical connecting surface of the opposite-side optical connector without sliding the optical connector 25 itself. In addition, the optical connector 25 and opposite-side optical connector are accurately aligned. In this case, damage to the opposite-side optical connector, caused by the guide pins, can also be suppressed. In addition, the guide pins 29 are inserted into the pin insertion holes of the opposite-side optical connector after the optical connector 25 and opposite-side optical connector are almost positioned by the adapter 39. This prevents the guide pins 29 from scratching the pin insertion holes.

Furthermore, when the coupling member 34 is slid to make the other end portions of the guide pins 29 protrude from the optical connecting surface 31, the tilted projection 37 of the coupling member 34 is located below the locking piece 35. This can prevent the locking piece 35 from moving into the housing member 27. Since the movement of the locking piece 35 into the housing member 27 is restricted, the locking pawl 36 does not accidentally disengage from the pawl portion 40. This makes it possible to reliably keep the optical connector 25 and opposite-side optical connector optically connected to each other.

In addition, when the tilted projection 37 of the coupling member 34 is located below the locking piece 35, the sliding movement of the coupling member 34 itself is suppressed and the coupling member 34 is fixed owing to the elastic restoring force of the locking piece 35 and the locking force of the locking pawl 36 and pawl portion 40 (the locking piece 35 is fixed with the locking force). In this embodiment, therefore, the tilted projection 37, locking piece 35, locking pawl 36, pawl portion 40, and the like function as pin fixing means. In this embodiment, the opposite-side optical component is also an optical connector. However, the opposite-side optical component may be an optical component other than an optical connector.

(Third Embodiment)

The third embodiment of the optical connector of the present invention will be described next with reference to FIGS. 5A and 5B. The optical connector according to the third embodiment differs from the optical connector according to the second embodiment in the position of a spring 30.

Figure 5A:
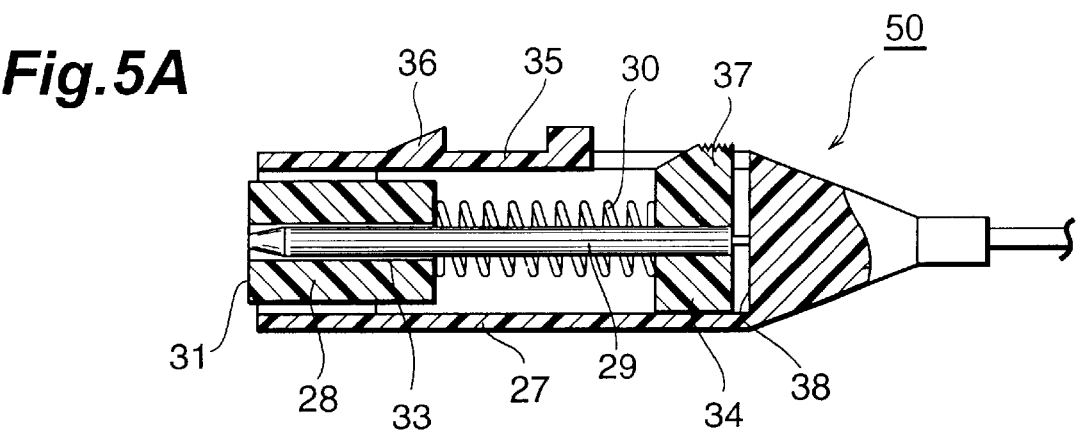
FIG. 5A is a sectional view showing the third embodiment of the optical connector of the present invention and an optical non-connection state.
Figure 5B:
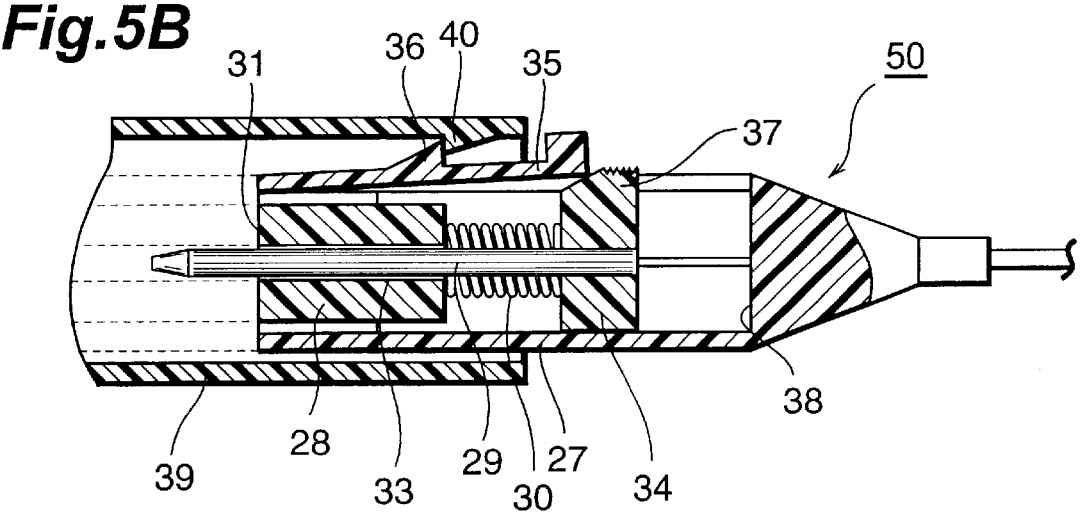
FIG. 5B is a sectional view showing the third embodiment of the optical connector of the present invention and an optical connection state.

As shown in FIG. 5A, in an optical connector 50 of this embodiment, the spring 30 is disposed between a ferrule 28 and a coupling member 34. One end portion of the spring 30 comes into contact with the opposite surface (rear surface) of the ferrule 28 to an optical connecting surface 31, and the other end portion of the spring 30 comes into contact with a surface of the coupling member 34 which opposes the ferrule 28. As in the second embodiment, the ferrule 28 slightly protrudes from a housing member 27 and is always biased toward the optical connecting surface 31 by the spring 30.

When the optical connector 50 described above is to be optically connected to an opposite-side optical connector, the coupling member 34 is operated first to accommodate the other ends of guide pins 29 in pin insertion holes 33 as in the second embodiment. The optical connecting surface 31 is cleaned, as needed. Since the other end portions of the guide pins 29 do not protrude from the optical connecting surface 31, and the optical connecting surface 31 of the ferrule 28 forms part of the outermost peripheral portion of the optical connector 50, the optical connecting surface 31 can be easily cleaned. In addition, while the opposite-side optical connector is not connected, i.e., the guide pins 29 are accommodated in the pin insertion holes 33, the optical connecting surface 31 of the ferrule 28 is located at the extreme tip portion of an optical connector 25 when viewed in the optical axis direction of optical fibers.

When the optical connector 50 is inserted from one end of an adapter 39, and the opposite-side optical connector is inserted from the other end of the adapter 39, a locking pawl 36 is locked to a pawl portion 40. while the optical connecting surface 31 of the optical connector 50 is pressed against the optical connecting surface of the opposite-side optical connector with the elastic restoring force of the spring 30. The same applies to the opposite-side optical connector. At this time, the ferrule 28 slightly moves toward a housing member 27. In this state, a tilted projection 37 of the coupling member 34 is further operated to make the other ends of the pair of guide pins 29 protrude from the optical connecting surface 31 and insert them into the pin insertion holes of the opposite-side optical connector.

As a consequence, the optical connector 50 and opposite-side optical connector are accurately positioned. In this case, damage to the opposite-side optical connector, caused by the guide pins, can be suppressed. In addition, since the guide pins 29 are inserted into the pin insertion holes of the opposite-side optical connector after the optical connector 50 and opposite-side optical connector are almost positioned by the adapter 39, the guide pins 29 are prevented from scratching the pin insertion holes.

When the coupling member 34 is slid to make the other end portions of the guide pins 29 protrude from the optical connecting surface 31, the tilted projection 37 of the coupling member 34 is located below a locking piece 35. This can prevent the locking piece 35 from moving into the housing member 27. Since the movement of the locking piece 35 into the housing member 27 is prevented, the locking pawl 36 does not accidentally disengage from the pawl portion 40. This makes it possible to reliably keep the optical connector 50 and opposite-side optical connector optically connected to each other, as shown in FIG. 5B.

When the coupling member 34 of the optical connector 50 is slid, the biasing force applied from the spring 30 to the ferrule 28 gradually increases as the spring 30 is gradually compressed. This allows the guide pins 29 to be inserted into the pin insertion holes of the opposite-side optical connector in the presence of low biasing force applied from the spring 30 to the ferrule 28, and the ferrule 28 can be made to float in the housing member 27. As a consequence, the end faces of optical fibers in the optical fiber cable 26 inserted and fixed in the fiber insertion holes 32 of the ferrule 28 can be accurately aligned with the end faces of optical fibers in the opposite-side optical connector.

A projection may be formed on the coupling member 34 and a recess that can engage with the projection on the coupling member 34 may be formed in the housing member 27. With this arrangement, the coupling member 34 may be locked at a position where the other end portions of the guide pins 29 protrude from the optical connecting surface 31 by engaging the projection of the coupling member 34 with the recess of the housing member 27.

(Fourth Embodiment)

The fourth embodiment of the optical connector of the present invention will be described next with reference to FIGS. 6A and 6B. The optical connector according to the fourth embodiment differs from the optical connectors according to the first to third embodiments-in that a ferrule slides.

Figure 6A:
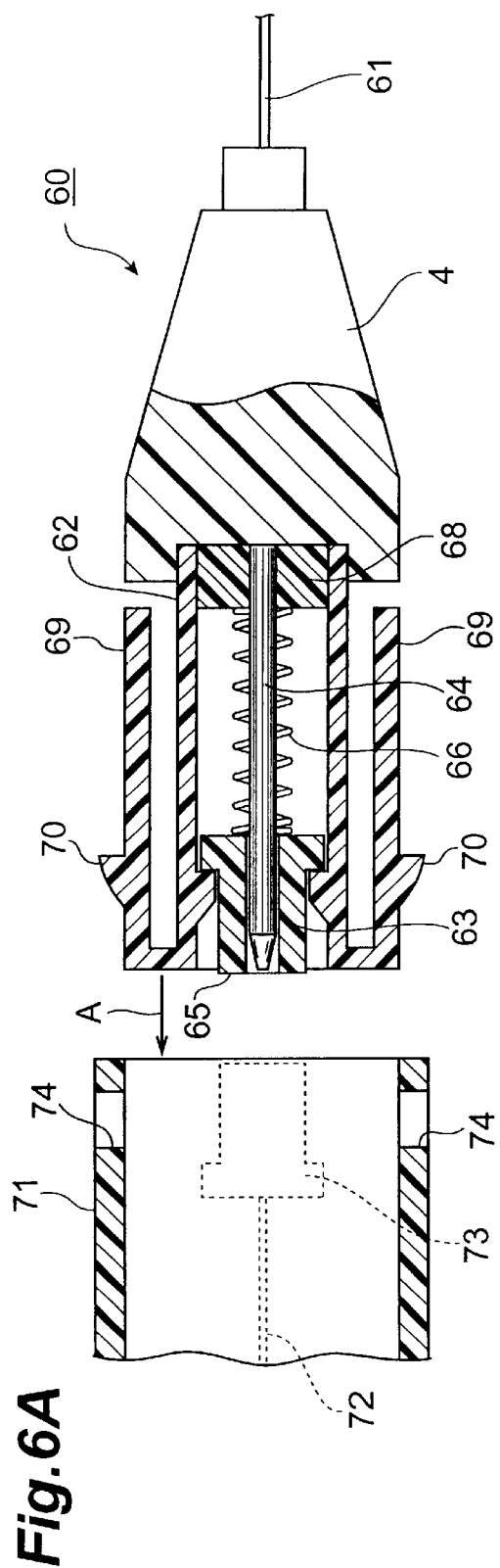
FIG. 6A is a sectional view showing the fourth embodiment of the optical connector of the present invention and an optical non-connection state.

As shown in FIG. 6A, an optical connector 60 of this embodiment is a two-latch type optical connector. The optical connector 60 of this embodiment is also attached to the distal end of an optical fiber cable 61, and has a ferrule 63, a pair of guide pins 64, and the like in a housing member 62. An optical connecting surface 65 of the ferrule 63 slightly protrudes from the housing member 62. The ferrule 63 is always biased toward the optical connecting surface 65 side by a spring 66. Stepped portions formed on side surfaces of the ferrule 63 engage with projections formed on the inner surface of the housing member 62 to prevent the ferrule 63 from popping out of the housing member 62.

Fiber insertion holes (not shown) and pin insertion holes 67 are formed through the ferrule 63. The fiber insertion holes and pin insertion holes 67 are open to the optical connecting surface 65 of the ferrule 63 as in the first to third embodiments. All the fiber insertion holes and pin insertion holes 67 are parallel to each other. The guide pins 64 are respectively inserted into the pair of pin insertion. holes 67. Each guide pin 64 is longer than each pin insertion hole 67. The one end portions of the pair of guide pins 64 are coupled to each other through a coupling member 68 having a through hole in its central portion. The coupling member 68 is fixed to the housing member 62.

The spring 66 is disposed between the ferrule 63 and the coupling member 68. One end portion of the spring 66 comes into contact with the opposite surface (rear surface) of the ferrule 63 to the optical connecting surface 65, and the other end portion of the spring 66 comes into contact with a surface of the coupling member 68 which opposes the ferrule 63. Since the one end portions of the pair of guide pins 64 are coupled with the coupling member 68, the sliding movements of the guide pins 64 to the other end thereof are restricted to prevent them from falling off to the optical connecting surface 65 side.

The optical fiber cable 61 extends through the through hole formed in the central portion of the coupling member 68. Optical fibers in the optical. fiber cable 61 are inserted and fixed in the fiber insertion holes of the ferrule 63. The ferrule 63 is slidable in the axial direction of the guide pins 64, and the pair of guide pins 64 and ferrule 63 are movable relative to each other. The housing member 62 has cantilevered locking pieces 69 on its two side surfaces. Locking pawls 70 are formed on the outer surfaces of the locking pieces 69.

The opposite-side optical connector, to which the optical connector 60 described above is optically connected, has a ferrule 73 attached to the distal end of an optical fiber cable 72 and the like. Hole portions 74 locked to the above locking pawls 70 are formed in side surfaces of the housing member 71. In this case, the ferrule 73 has the same arrangement as that of the ferrule 63 described above.

As shown in FIG. 6A, while the opposite-side optical connector is not connected, the ferrule 63 is biased by the spring 66 to be located near the opposite-side optical connector, and the guide pins 64 are respectively accommodated in the pin insertion holes 67. With this operation, while the opposite-side optical component, i.e., the opposite-side optical connector, is not connected, the optical connecting surface 65 of the ferrule 63 is located at the extreme tip portion of the optical connector 60 when viewed from the optical axis direction of the optical fibers.

When the optical connector 60 described above is to be optically connected to the opposite-side optical connector, an optical connecting surface 65 is cleaned, as needed. Since the other end portions of the guide pins 64 do hot protrude from the optical connecting surface 65, cleaning is facilitated.

When the pin insertion holes of the ferrule 73 of the opposite-side optical connector and the pair of guide pins 64 are aligned, and the optical connector 60 is inserted from one end of the opposite-side optical connector (housing member 71) in the direction indicated by an arrow A, the optical connecting surface 65 of the ferrule 63 comes into contact with the optical connecting surface of the opposite-side optical connector (ferrule 73). When the optical connector 60 is further inserted while the optical connecting surface 65 of the ferrule 63 is in contact with the optical connecting surface of the opposite-side optical connector, the ferrule 63 moves against the biasing force of the spring 66 in a direction opposite to the inserting direction of the optical connector 60 (housing member 62). Upon movement of the ferrule 63, the other ends of the pair of guide pins 64 protrude from the optical connecting surface 65 and are inserted into the pin insertion holes of the opposite-side optical connector.

Figure 6B:
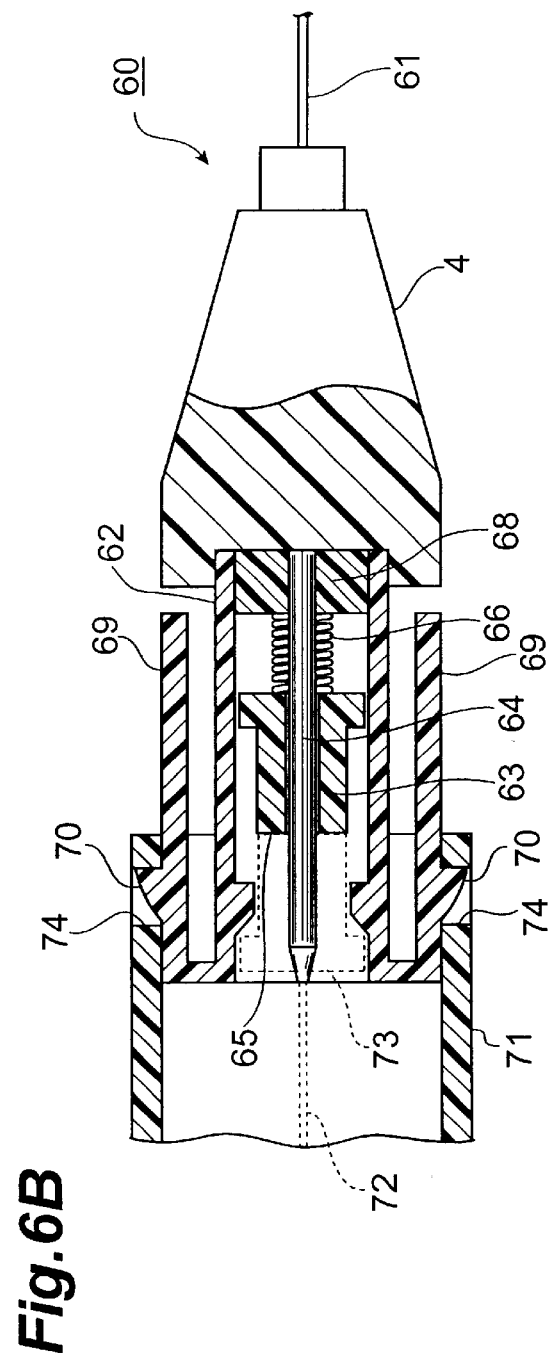
FIG. 6B is a sectional view showing the fourth embodiment of the optical connector of the present invention and an optical connection state.

When the optical connector 60 is inserted to a predetermined position, the locking pawls 70 are locked to the hole portions 74, as shown in FIG. 6B. When the locking-pawls 70 are locked to the hole portions 74, the optical connector 60 is coupled to the opposite-side optical connector. Since the elastic restoring force of the spring 66 acts on the locking pawls 70 of the housing member 62 through the coupling member 68, the locking pawls 70 are reliably locked to the hole portions 74.

As a consequence, the optical connecting surface 65 comes into contact with the optical connecting surface of the opposite-side optical connector while the optical connecting surface 65 of the ferrule 63 is located at the extreme tip portion of the optical connector 60 when viewed from the optical axis direction of the optical fibers, and the other ends of the guide pins 64 are accommodated in the pin insertion holes 67. This prevents the guide pins 64 from damaging the opposite-side optical connector.

In addition, when the opposite-side optical connector is mounted on a board, the optical connector 60 can be transferred and mounted from above the board. This makes it easy to optically connect the optical connector 60 to the opposite-side optical connector mounted on the board.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector comprising:

a ferrule having an optical connecting surface with which an opposite-side optical component is brought into contact;

a boot member, connected to said ferrule, serving as the lead-in portion of an optical fiber;

a pair of guide pins for aligning with the opposite-side optical component; and a coupling member for coupling said pair of guide pins on one end portion of said pair of guide pins.

wherein at least one fiber insertion hole into which an optical fiber is inserted and a pair of pin insertion holes into which said pair of guide pins are slidably inserted are formed in said ferrule, one end portion of the fiber insertion hole and one end portion of each of the pin insertion holes are open to the optical connecting surface, each of said pair of guide pins has a total length larger than a total length of each of the pin insertion holes, axial positions of said guide pins can be arbitrarily changed from outside by moving said coupling member, and other ends of said guide pins can be accommodated in the pin insertion holes by sliding said guide pins and said ferrule and said boot member restrict moving of said coupling member so as to prevent said pair of guide pins from falling off from the pin insertion holes.

2. A connector according to claim 1, said boot member has coupling member locking means for locking said boot member while the other ends of said pair of guide pins are accommodated in the pin insertion holes.

3. A connector according to claim 1, wherein a chamfered portion is formed on at least a portion of an edge portion of the optical connecting surface.

4. A connector according to claim 1, further comprising pin fixing means for fixing said pair of guide pins while the other ends of said pair of guide pins protrude from the optical connecting surface.

5. An optical coupling structure for optically coupling said optical connector defined in claim 1 to an optical module surface-mounted on a board, wherein said optical module includes an optical connecting surface with which an optical connecting surface of said ferrule is brought into contact, and an extended portion extended in a direction substantially perpendicular to an optical fiber accommodated in said ferrule, and said optical connector or a portion thereof and the extended portion are clamped by a clamp member.

6. A connector according to claim 1, said ferrule has a constricted portion on the boot member side, and a central portion of said coupling member straddles said constricted portion.

7. An optical connector comprising:

a ferrule having an optical connecting surface with which an opposite-side optical component is brought into contact;

a boot member, connected to said ferrule, serving as the lead-in portion of an optical fiber;

a pair of guide pins for positioning with respect to the opposite-side optical component; and a coupling member for coupling said pair of guide pins on one end portion of said pair of guide pins.

wherein at least one fiber insertion hole into which an optical fiber is inserted and a pair of pin insertion holes into which said pair of guide pins are slidably inserted are formed in said ferrule, one end portion of the fiber insertion hole and one end portion of each of the pin insertion holes are open to the optical connecting surface and each of said pair of guide pins has a total length larger than a total length of each of the pin insertion holes, said ferrule and said pair of guide pins can relatively move by moving said coupling member, said ferrule and said boot member restrict moving of said coupling member so as to prevent said pair of guide pins from falling off from the pin insertion holes, and the optical connecting surface of said ferrule is located at an extreme tip portion when viewed from an optical axis direction of the optical fiber while said opposite-side optical component is not connected.

8. A connector according to claim 7, further comprising pin locking means for locking said pair of guide pins while the other ends of said pair of guide pins are accommodated in the pin insertion holes.

9. A connector according to claim 7, wherein a chamfered portion is formed on at least a portion of an edge portion of the optical connecting surface.

10. A connector according to claim 7, further comprising pin fixing means for fixing said pair of guide pins while the other ends of said pair of guide pins protrude from the optical connecting surface.

11. An optical coupling structure for optically coupling said optical connector defined in claim 8 to an optical module surface-mounted on a board, wherein said optical module includes an optical connecting surface with which an optical connecting surface of said ferrule is brought into contact, and an extended portion extended in a direction substantially perpendicular to an optical fiber accommodated in said ferrule, and said optical connector or a portion thereof and the extended portion are clamped by a clamp member.

12. A connector according to claim 7, said ferrule has a constricted portion on the boot member side, and a central portion of said coupling member straddles said constricted portion.

13. An optical connector comprising:

a ferrule having an optical connecting surface with which an opposite-side optical component is brought into contact;

a boot member, connected to said ferrule serving as the lead-in portion of an optical fiber;

a pair of guide pins for positioning with respect to the opposite-side optical component; and a coupling member for coupling said pair of guide pins on one end portion of said pair of guide pins, wherein at least one fiber insertion hole into which an optical fiber is inserted and a pair of pin insertion holes into which said pair of guide pins are slidably inserted are formed in said ferrule, one end portion of the fiber insertion hole and one end portion of each of the pin insertion holes are open to the optical connecting surface, and each of said pair of guide pins has a total length larger than a total length of each of the pin insertion holes, a sliding position of said guide pins can be arbitrarily changed by moving said coupling member, and other ends of said guide pins can be accommodated in the pin insertion holes by sliding said guide pins, said ferrule and said boot member restrict moving of said coupling member so as to prevent said pair of guide pins from falling off from the pin insertion holes, and the optical connecting surface of said ferrule is located at an extreme tip portion when viewed from an optical axis direction of the optical fiber while the other ends of said pair of guide pins are accommodated in the pin insertion holes.

* * * * *